(12) United States Patent
Hasegawa et al.

(10) Patent No.: US 11,248,275 B2
(45) Date of Patent: *Feb. 15, 2022

(54) WARM-WORKABLE HIGH-STRENGTH STEEL SHEET AND METHOD FOR MANUFACTURING THE SAME

(71) Applicant: JFE STEEL CORPORATION, Tokyo (JP)

(72) Inventors: Hiroshi Hasegawa, Tokyo (JP); Yoshimasa Funakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 474 days.

This patent is subject to a terminal disclaimer.

(21) Appl. No.: 16/073,397

(22) PCT Filed: Jan. 26, 2017

(86) PCT No.: PCT/JP2017/002613
§ 371 (c)(1),
(2) Date: Jul. 27, 2018

(87) PCT Pub. No.: WO2017/131052
PCT Pub. Date: Aug. 3, 2017

(65) Prior Publication Data
US 2020/0032362 A1    Jan. 30, 2020

(30) Foreign Application Priority Data
Jan. 29, 2016  (JP) .............................. JP2016-016096

(51) Int. Cl.
| | |
|---|---|
| *C22C 38/38* | (2006.01) |
| *C21D 9/46* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/16* | (2006.01) |
| *C23C 2/06* | (2006.01) |
| *C23C 2/28* | (2006.01) |
| *C22C 38/60* | (2006.01) |
| *C22C 38/42* | (2006.01) |

(Continued)

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/16* (2013.01); *C22C 38/38* (2013.01); *C22C 38/42* (2013.01); *C22C 38/54* (2013.01); *C22C 38/60* (2013.01); *C23C 2/06* (2013.01); *C23C 2/28* (2013.01); *B29L 2009/008* (2013.01); *C21D 2211/001* (2013.01); *C21D 2211/005* (2013.01); *C21D 2211/008* (2013.01); *Y10T 428/12799* (2015.01)

(58) Field of Classification Search
CPC ...... B32B 15/013; C21D 6/001; C21D 6/002; C21D 6/005; C21D 6/008; C21D 8/0205; C21D 8/0263; C21D 2211/001; C21D 2211/005; C21D 2211/008; C22C 38/001; C22C 38/002; C22C 38/005; C22C 38/008; C22C 38/02; C22C 38/06; C22C 38/08; C22C 38/16; C22C 38/38; C22C 38/42; C22C 38/54; C22C 38/60; C23C 2/06; C23C 2/28; Y10T 428/12799; B29L 2009/008
USPC ......................................................... 428/684
See application file for complete search history.

(56) References Cited

U.S. PATENT DOCUMENTS

| | | | | |
|---|---|---|---|---|
| 10,370,737 B2 * | 8/2019 | Hasegawa | ............ | C21D 8/0463 |
| 10,450,642 B2 * | 10/2019 | Hasegawa | ............. | B32B 15/043 |

(Continued)

FOREIGN PATENT DOCUMENTS

| | | |
|---|---|---|
| CN | 102712980 A | 10/2012 |
| CN | 103582714 A | 2/2014 |

(Continued)

OTHER PUBLICATIONS

May 9, 2019 Office Action issued in European Patent Application No. 17744282.9.

(Continued)

*Primary Examiner* — Humera N. Sheikh
*Assistant Examiner* — John D Schneible
(74) *Attorney, Agent, or Firm* — Oliff PLC

(57) ABSTRACT

A warm-workable high-strength steel sheet having superior warm workability and residual ductility after warm working, and a method for manufacturing such steel sheets. The warm-workable high-strength steel sheet has a chemical composition including, in mass %, C: 0.05 to 0.20%, Si: not more than 3.0%, Mn: 3.5 to 8.0%, P: not more than 0.100%, S: not more than 0.02%, Al: 0.01 to 3.0% and N: not more than 0.010%, the balance being Fe and inevitable impurities. The steel sheet has a microstructure that includes, in area fractions, 10 to 60% retained austenite, 10 to 80% ferrite, 5 to 50% martensite and 0 to 5% bainite, the C content in the retained austenite being less than 0.40 mass %.

21 Claims, No Drawings

(51) Int. Cl.
    *C22C 38/54*     (2006.01)
    *B29L 9/00*     (2006.01)

(56) References Cited

U.S. PATENT DOCUMENTS

| | | | |
|---|---|---|---|
| 2011/0083774 A1 | 4/2011 | Jin et al. | |
| 2013/0037180 A1 | 2/2013 | Sano et al. | |
| 2014/0050941 A1* | 2/2014 | Kawasaki | B32B 15/012 |
| | | | 428/653 |
| 2014/0103684 A1 | 4/2014 | Takagi et al. | |
| 2014/0308156 A1 | 10/2014 | Oh et al. | |
| 2016/0168656 A1 | 6/2016 | Kawabe et al. | |
| 2018/0030564 A1 | 2/2018 | Hasegawa et al. | |
| 2019/0040489 A1* | 2/2019 | Hasegawa | C22C 38/005 |

FOREIGN PATENT DOCUMENTS

| | | |
|---|---|---|
| CN | 103917681 A | 7/2014 |
| EP | 2530179 A1 | 12/2012 |
| EP | 2 703 512 A1 | 3/2014 |
| EP | 2708610 A1 | 3/2014 |
| EP | 2778247 A1 | 9/2014 |
| EP | 3 170 912 A1 | 5/2017 |
| JP | H01-259120 A | 10/1989 |
| JP | 2010-090475 A | 4/2010 |
| JP | 2012-251239 A | 12/2012 |
| JP | 2013-040383 A | 2/2013 |
| JP | 2014-062286 A | 4/2014 |
| JP | 2015-503023 A | 1/2015 |
| WO | 2011/093319 A1 | 8/2011 |
| WO | 2016/010144 A1 | 1/2016 |

OTHER PUBLICATIONS

Sep. 25, 2020 Office Action issued in Chinese Patent Application No. 201780008556.7.
Mar. 20, 2020 Office Action issued in Chinese Patent Application No. 201780008556.7.
Sep. 17, 2018 Search Report issued in European Patent Application No. 17744282.9.
Oct. 25, 2019 Office Action issued in European Patent Application No. 17 744 282.9.
May 9, 2017 Search Report issued in International Patent Application No. PCT/JP2017/002613.
H. Karbasian et al. "A Review on Hot Stamping" Journal of Materials Processing Technology, vol. 210, 2010, pp. 2103-2118.
Sep. 5, 2019 Office Action issued in Chinese Patent Application No. 201780008556.7.
Sep. 21, 2018 Office Action issued in U.S. Appl. No. 15/543,271.
Oct. 1, 2018 Office Action issued in U.S. Appl. No. 15/543,062.
Mar. 15, 2019 Office Action issued in U.S. Appl. No. 15/543,062.

* cited by examiner

WARM-WORKABLE HIGH-STRENGTH STEEL SHEET AND METHOD FOR MANUFACTURING THE SAME

TECHNICAL FIELD

The present disclosure relates to a warm-workable high-strength steel sheet having superior warm workability and residual ductility after warm working, and to a method for manufacturing such steel sheets.

BACKGROUND ART

To improve the crash safety of automobiles and to enhance fuel efficiency by weight reduction, steel sheets used for automobile parts are required to have higher strength. However, strengthening of materials such as steel sheets is generally accompanied by a decrease in workability. Thus, the development of steel sheets that are excellent in both strength and workability has been demanded. Further, superior residual ductility after the working of steel sheets has been also required in order to avoid fracture under overloaded conditions.

Under such circumstances, steel sheets with various characteristics have been developed. Patent Literature 1 discloses a technique associated with increasing the elongation (hereinafter, EL) of steel sheets by making use of retained austenite. Non Patent Literature 1 discloses a technique in which steel is worked after it is heated to an austenite single phase, and thereby high workability is attained while the amount of carbon in the austenite is reduced. Patent Literature 2 discloses a technique associated with retained austenite-containing steel which exhibits excellent elongation and strength even when the heating temperature is lowered to 300° C.

CITATION LIST

Patent Literature

PTL 1: Japanese Unexamined Patent Application Publication No. 2010-90475
PTL 2: Japanese Unexamined Patent Application Publication No. 2014-62286

Non Patent Literature

NPL 1: H. Karbasian, A. E. Tekkaya: Journal of Materials Processing Technology, 210 (2010), pp. 2103-2118

SUMMARY

Technical Problem

The steel sheets described in Patent Literature 1 have a problem in that warm workability is poor because the C content in the retained austenite is high so as to ensure that the retained austenite will be stably present at room temperature.

The technique disclosed in Non Patent Literature 1 entails a facility for heating steel sheets at high temperatures, and the lowering of the heating temperature is desired because of the high running cost of the facility.

Further, the technique has a problem in that residual ductility is poor because the final microstructure is martensite.

In the steel sheets described in Patent Literature 2, the C content in the retained austenite is as high as 0.5 mass % or above, and the martensite formed by working is hard and causes a decrease in residual ductility. Further, not only the lowering of the working temperature is insufficient but also no consideration is given to residual ductility.

As discussed above, there have been no reports of warm-workable high-strength steel sheets which are excellently workable even at a low heating temperature of about 50 to 200° C. and exhibit superior residual ductility after being worked. The development of such steel sheets has been demanded.

Objects of the present disclosure are to provide a warm-workable high-strength steel sheet having superior warm workability and residual ductility after warm working, and a method for manufacturing such steel sheets.

Solution to Problem

To achieve the above objects, the present inventors carried out extensive studies and have consequently found the following.

Steel sheets having superior warm workability and residual ductility after warm working can be obtained by adopting an adjusted specific chemical composition and controlling the area fraction of retained austenite and the amount of carbon in the retained austenite, both as measured before warm working, to 10 to 60% and to less than 0.40 mass %, respectively. Retained austenite with such a low C content is formed incidentally by insufficient austempering and has been considered as a phase that should be avoided for reasons such as poor working characteristics at room temperature, low stability, and easy variation with time.

Thus, few studies have been made and little is known about how to form low-carbon retained austenite in a large amount.

In most cases, retained austenite that is formed incidentally has a C content of about 0.7% or above. The present inventors have assumed that retained austenite which has a lower C content than the conventional level and is present stably in a large amount will allow for significantly enhanced warm workability and, at the same time, high strength even at room temperature, and will further provide enhanced residual ductility. The present inventors have then found that this idea can be achieved by controlling in a sophisticated manner the contents of C, Mn and other alloying elements and also annealing conditions.

That is, a steel sheet exhibits excellent workability at 50 to 200° C. when the chemical composition includes, in mass %, C: 0.05 to 0.20%, Si: not more than 3.0%, Mn: 3.5 to 8.0%, P: not more than 0.100%, S: not more than 0.02%, Al: 0.01 to 3.0% and N: not more than 0.010%, the balance being Fe and inevitable impurities, and the steel includes, in area fractions, 10 to 60% retained austenite, 10 to 80% ferrite, 5 to 50% martensite and 0 to 5% bainite, the C content in the retained austenite being less than 0.4 mass %.

Further, this steel sheet, after being warm worked at such low temperatures, exhibits superior residual ductility.

In the present disclosure, the term "high strength" means that tensile strength (hereinafter, sometimes abbreviated as TS) at room temperature is not less than 1180 MPa. Excellent warm workability means that EL at 150° C. is not less than 27%. Superior residual ductility means that the steel, after being strained with 27% EL at 150° C., has an elongation at room temperature of not less than 10%. The term "steel sheets" comprehends various types of steel sheets: cold-rolled steel sheets, hot-rolled steel sheets, and galvanized steel sheets and galvannealed steel sheets of these steel sheets, and these terms are used individually when the types of steel sheets need to be distinguished in the description.

The disclosed exemplary embodiments of the present disclosure are as follows.

[1] A warm-workable high-strength steel sheet having a chemical composition including, in mass %, C: 0.05 to 0.20%, Si: not more than 3.0%, Mn: 3.5 to 8.0%, P: not more than 0.100%, S: not more than 0.02%, Al: 0.01 to 3.0% and N: not more than 0.010%, the balance being Fe and inevitable impurities, the steel sheet having a microstructure which includes, in area fractions, 10 to 60% retained austenite, 10 to 80% ferrite, 5 to 50% martensite and 0 to 5% bainite, the C content in the retained austenite being less than 0.40 mass %.

[2] The warm-workable high-strength steel sheet described in [1], wherein Md30 is 80 to 280° C.

[3] The warm-workable high-strength steel sheet described in [1] or [2], wherein the chemical composition further includes, in mass %, one or more selected from Cr: 0.005 to 2.0%, Ni: 0.005 to 2.0%, Cu: 0.005 to 2.0%, B: 0.0001 to 0.0050%, Ca: 0.0001 to 0.0050%, REM: 0.0001 to 0.0050%, Sn: 0.01 to 0.50% and Sb: 0.0010 to 0.10%.

[4] The warm-workable high-strength steel sheet described in any one of [1] to [3], which has a galvanized coating or a galvannealed coating on the surface.

[5] The warm-workable high-strength steel sheet described in any one of [1] to [4], which has a tensile strength of not less than 1180 MPa and an elongation at 150° C. of not less than 27%.

[6] A method for manufacturing a warm-workable high-strength steel sheet, including a hot rolling step of hot rolling a steel into a hot-rolled steel sheet, the steel having a chemical composition described in [1] or [3], a pickling step of pickling the hot-rolled steel sheet, an annealing holding step of heating the steel sheet pickled to a temperature in the range of above 680° C. and not more than 720° C. and holding the steel sheet in the temperature range for 500 to 1000 s, and an annealing cooling step of cooling the steel sheet at an average rate of cooling from Ms point to room temperature of not less than 10° C./s.

[7] The method for manufacturing a warm-workable high-strength steel sheet described in [6], wherein the method further includes a cold rolling step of cold rolling the steel sheet after the pickling step to form a cold-rolled steel sheet, and the cold-rolled steel sheet is subjected to the annealing holding step.

[8] The method for manufacturing a warm-workable high-strength steel sheet described in [6] or [7], wherein the method includes galvanizing the steel sheet between the annealing holding step and the annealing cooling step.

[9] The method for manufacturing a warm-workable high-strength steel sheet described in [8], wherein the method further includes alloying the steel sheet between the galvanizing and the annealing cooling step.

[10] A method for manufacturing a warm-workable high-strength steel sheet, including an annealing holding step of heating a hot-rolled or cold-rolled steel sheet having a chemical composition described in [1] or [3] to a temperature in the range of above 680° C. and not more than 720° C. and holding the steel sheet in the temperature range for 500 to 1000 s, and an annealing cooling step of cooling the steel sheet at an average rate of cooling from Ms point to room temperature of not less than 10° C./s.

Advantageous Effects

According to the present disclosure, warm-workable high-strength steel sheets having superior warm workability and residual ductility after warm working can be obtained.

DESCRIPTION OF EMBODIMENTS

Hereinbelow, embodiments of the present disclosure will be described. The unit "%" for the contents (or simply "amounts") of elements indicates "mass %" unless otherwise mentioned.

1) Chemical Composition

C: 0.05 to 0.20%

Carbon is an element effective for increasing TS, EL and residual ductility by forming martensite and retained austenite. This effect cannot be fully obtained if the C content is less than 0.05%. If, on the other hand, the C content exceeds 0.20%, retained austenite comes to contain an increased amount of carbon so that warm workability and residual ductility after warm working are deteriorated. Thus, the C content is limited to 0.05 to 0.20%. The C content is preferably 0.10 to 0.20%.

Si: not more than 3.0%

Silicon is an element that can provide high TS by solution strengthening of steel. In the present disclosure, high strength, excellent warm workability and superior residual ductility after warm working can be obtained even in the absence of silicon. A possible preferred lower limit of the amount of silicon may be 0.01 mass % or above. If, on the other hand, the amount of silicon exceeds 3.0%, the steel becomes brittle and the residual ductility after warm working is deteriorated. Thus, the Si content is limited to not more than 3.0%, and is preferably not more than 2.5%, and more preferably not more than 2.0%.

Mn: 3.5 to 8.0%

Manganese is an element effective for increasing TS, EL and residual ductility by forming martensite and retained austenite. This element is also effective for decreasing the amount of carbon in the retained austenite. Adding less than 3.5% manganese reduces the manifestation of these effects and also tends to result in the formation of bainite that is undesirable in the present disclosure. If, on the other hand, the Mn content exceeds 8.0%, the steel becomes brittle and the residual ductility after warm working is deteriorated. Thus, the Mn content is limited to 3.5 to 8.0%, and is preferably 3.5 to 7.0%. The lower limit of the Mn content is preferably above 3.5%, more preferably above 4.0%, and still more preferably 4.5% or above.

P: not more than 0.100%

Phosphorus embrittles steel and can cause a decrease in residual ductility after warm working. It is therefore desirable that the amount thereof be as low as possible. In the present disclosure, up to 0.100% phosphorus is acceptable. The amount of phosphorus is preferably not more than 0.02%. The lower limit is not particularly limited. However, production efficiency is lowered if the P content is reduced to below 0.001%. Thus, the P content is preferably 0.001% or above.

S: not more than 0.02%

Sulfur embrittles steel and can cause a decrease in residual ductility after warm working. It is therefore desirable that the amount thereof be as low as possible. In the present disclosure, up to 0.02% sulfur is acceptable. The amount of sulfur is preferably not more than 0.005%. The lower limit is not particularly limited. However, production efficiency is lowered if the S content is reduced to below 0.0005%. Thus, the S content is preferably 0.0005% or above.

Al: 0.01 to 3.0%

Aluminum promotes the formation of ferrite and is therefore an element effective for obtaining ferrite. If the amount of aluminum is more than 3.0%, the steel is embrittled and the residual ductility after warm working is sometimes decreased. Thus, the Al content is limited to not more than 3.0%, and is preferably not more than 1.5%, and more preferably not more than 1.0%. From the point of view of deoxidation during steelmaking process, the Al content is limited to not less than 0.01%, and is preferably not less than 0.02%.

N: not more than 0.010%

Nitrogen hardens martensite and causes a decrease in residual ductility after warm working. It is therefore desirable that the amount thereof be as low as possible. In the present disclosure, up to 0.010% nitrogen is acceptable. The amount of nitrogen is preferably not more than 0.007%. The lower limit is not particularly limited. However, production efficiency is lowered if the N content is reduced to below 0.0005%. Thus, the N content is preferably 0.0005% or above.

The balance is iron and inevitable impurities. Where necessary, one or more of the following elements (optional elements) may be added appropriately.

One or more selected from Cr: 0.005 to 2.0%, Ni: 0.005 to 2.0%, Cu: 0.005 to 2.0%, B: 0.0001 to 0.0050%, Ca: 0.0001 to 0.0050%, REM: 0.0001 to 0.0050%, Sn: 0.01 to 0.50% and Sb: 0.0010 to 0.10%

Chromium, nickel and copper allow martensite to form and are therefore elements effective for strengthening. To obtain this effect, the contents of chromium, nickel and copper are preferably each not less than 0.005%, and more preferably not less than 0.05%. If each of the contents of chromium, nickel and copper exceeds 2.0%, there is a risk that residual ductility after warm working may be lowered. The contents are more preferably each not more than 1.0%.

Boron allows martensite to form and is therefore an element effective for strengthening. To obtain this effect, the amount of boron is preferably not less than 0.0001%, and more preferably not less than 0.0005%. If the amount of boron exceeds 0.0050%, an increased amount of inclusions is formed to cause a risk that residual ductility after warm working may be lowered. The B content is more preferably not more than 0.0030%.

Calcium and REM allow for controlling of the morphology of inclusions and are therefore elements that are effective for enhancing residual ductility after warm working. To obtain this effect, the contents of calcium and REM are each preferably not less than 0.0001%, and more preferably not less than 0.0005%. If each of the contents of calcium and REM exceeds 0.0050%, an increased amount of inclusions is formed to cause a risk that residual ductility after warm working may be lowered. The contents of these elements are more preferably each not more than 0.0040%.

Tin and antimony are elements that are effective for controlling the decrease in steel strength by suppressing reactions such as decarburization, denitrification and deboronization. To obtain this effect, the amount of tin is not less than 0.01%, and more preferably not less than 0.03%, and the amount of antimony is preferably not less than 0.0010%, and more preferably not less than 0.0050%. If the amount of tin exceeds 0.50% or the amount of antimony exceeds 0.10%, the steel is embrittled and the residual ductility after warm working may be decreased. The upper limits are preferably not more than 0.10% for tin and not more than 0.05% for antimony.

As described hereinabove, the contents of chromium, nickel, copper, boron, calcium, REM, tin and antimony are preferably Cr: 0.005 to 2.0%, Ni: 0.005 to 2.0%, Cu: 0.005 to 2.0%, B: 0.0001 to 0.0050%, Ca: 0.0001 to 0.0050%, REM: 0.0001 to 0.0050%, Sn: 0.01 to 0.50% and Sb: 0.0010 to 0.10%.

In the present disclosure, zirconium, magnesium, lanthanum and cerium may be present in a total content of not more than 0.002%, in addition to the elements described above.

In the case where any of the optional elements are present in amounts below the lower limits, such optional elements are regarded as inevitable impurities.

2) Microstructure of Steel Sheets

In the following description, the area fractions in the microstructure of the steel sheet are simply written as "%". When the steel sheet has been galvanized or galvannealed, the microstructure is that of the base steel without the galvanized or galvannealed coating.

Retained austenite: 10 to 60%

If the area fraction of retained austenite is less than 10%, the steel sheet fails to attain 1180 MPa or higher TS at room temperature and 27% or higher EL during warm working (EL being measured at 150° C. which corresponds to a temperature experienced during warm working). If the area fraction exceeds 60%, residual ductility after warm working is decreased. Thus, the area fraction of retained austenite is limited to 10 to 60%. The lower limit of the area fraction is preferably 20% or above or is preferably above 20%, is more preferably 30% or above or is more preferably above 30%, and is still more preferably 35% or above. The upper limit of the area fraction is preferably 55% or below.

Ferrite: 10 to 80%

If the area fraction of ferrite is less than 10%, the steel sheet fails to attain 27% or higher EL during warm working. If, on the other hand, the area fraction exceeds 80%, the high strength according to the present disclosure cannot be obtained. Thus, the area fraction of ferrite is limited to 10 to 80%. The area fraction is preferably 10 to 60%, and more preferably 10 to 50%.

Martensite: 5 to 50%

If the area fraction of martensite is less than 5%, the steel sheet fails to attain 1180 MPa or higher TS at room temperature. If, on the other hand, the area fraction exceeds 50%, 27% or higher EL cannot be obtained during warm working. Thus, the area fraction of martensite is limited to 5 to 50%. The lower limit of the area fraction is preferably 10% or above, more preferably above 20%, and still more preferably 25% or above.

Bainite: 0 to 5%

Bainite is undesirable in the present disclosure, but is acceptable within the limit of 5%. If the fraction thereof exceeds 5%, the steel sheet fails to attain both 1180 MPa or higher TS at room temperature and 27% or higher EL during warm working. Thus, the area fraction of bainite is limited to 0 to 5%, and is preferably 0 to 3%, and more preferably 0 to 1%.

The microstructure of the steel sheet of the present disclosure is composed of retained austenite, ferrite and martensite (and, if any present, bainite). No other phases such as pearlite are present. The total of retained austenite, ferrite and martensite is preferably not less than 95%.

Amount of carbon in retained austenite: less than 0.40 mass %

As will be described later, the amount of carbon in retained austenite is determined from Equation (1) and Equation (2). If the amount of carbon in retained austenite is 0.40 mass % or above, the residual ductility after warm working according to the present disclosure cannot be obtained. Thus, the amount of carbon in retained austenite is limited to less than 0.40 mass %, and is preferably less than 0.3 mass %, and more preferably less than 0.2 mass %.

In the present disclosure, the area fractions of ferrite and martensite indicate the proportions of the areas of the respective phases to the area observed. These area fractions are measured in the following manner. A sample is cut from the steel sheet, and a cross section through the sheet thickness that is parallel to the rolling direction is polished and is thereafter etched with 3% Nital. Regions that are found at ¼ sheet thickness are photographed with SEM (scanning electron microscope) at ×1500 magnification. The image data of three fields of view is analyzed to determine the area fractions of the respective phases using Image-Pro manufactured by Media Cybernetics. The area fractions in the fields of view are averaged to yield the area fractions of the respective phases. In the image data, ferrite is shown black, martensite and retained austenite are white, and bainite is dark gray including carbides or martensite-austenite constituents. The area fraction of martensite is determined by subtracting the area fraction of retained austenite, which is described later, from the area fraction of the white phases. In the present disclosure, martensite may be autotempered martensite or tempered martensite including carbides. Pearlite, which is absent in the present disclosure, is distinguishable as a black and white layered structure.

The volume fraction of retained austenite is measured as follows. The steel sheet is ground by ¼ sheet thickness and is further chemically polished by 0.1 mm. The polished surface is analyzed with an X-ray diffractometer using Mo Kα radiation to determine the integrated reflection intensities of (200) plane, (220) plane and (311) plane of fcc iron (austenite), and (200) plane, (211) plane and (220) plane of bcc iron (ferrite). The volume fraction is obtained from the ratio of the integrated reflection intensity of the planes of fcc iron to the integrated reflection intensity of the planes of bcc iron. In the present disclosure, the value of this volume fraction is used as that of the area fraction.

The lattice constant of retained austenite is calculated from Equation (1) using the amount of the shift of the diffraction peak of (220) plane obtained with an X-ray diffractometer using Co Kα radiation. Further, the amount of carbon in retained austenite is calculated from Equation (2).

[Math. 1]

$$a = 0.17889(2^{0.5})/\sin\theta \quad (1)$$

Here, a is the lattice constant (nm) of retained austenite, and θ the value (rad) obtained by dividing the diffraction peak angle of (200) plane by 2.

$$a = 0.3578 + 0.0033[C] + 0.000095[Mn] + 0.00006[Cr] + 0.0022[N] + 0.00056[Al] + 0.00015[Cu] + 0.00031[Mo] \quad (2)$$

Here, a is the lattice constant (nm) of retained austenite, and [M] the mass % of element M in the austenite phases.

In the present disclosure, the mass % of elements M (except carbon) in retained austenite is mass % relative to the whole steel. The amount of carbon in retained austenite can be calculated by substituting the value of "a" and the contents of the elements except carbon into Equation (2).

3) Characteristics

Md30: 80 to 280° C.

In the present disclosure, Md30 may be 80 to 280° C., in which case warm workability can be enhanced. The Md30 in the disclosure refers to the temperature at which the application of 30% true strain yields a 50% change in area fraction of retained austenite present in the absence of strain into martensite.

TS of warm-workable high-strength steel sheets: not less than 1180 MPa

Having high strength is necessary because the strength of an unworked portion of a warm worked member also significantly affects the strength of the whole member. Steels having TS at room temperature of less than 1180 MPa are not suited for framework structures. Thus, the TS of the warm-workable high-strength steel sheets is limited to not less than 1180 MPa, and is more preferably not less than 1320 MPa.

Elongation of warm-workable high-strength steel sheets at 150° C. (at warm temperature): not less than 27%

If the elongation at 150° C. (this temperature corresponds to a temperature experienced during warm working, the elongation being specified based on this temperature in the present disclosure) is less than 27%, the warm-workable high-strength steel sheet is poorly applicable to parts which have portions worked under severe conditions, such as pillars. Thus, the elongation at 150° C. is limited to not less than 27%.

The steel sheets of the present disclosure may have a galvanized or galvannealed coating on the surface. The chemical composition of the galvanized coating may be composed of, for example, 0.10 to 0.25% Al and the balance being zinc and inevitable impurities.

4) Conditions Under which Warm-Workable High-Strength Steel Sheets are Manufactured For example, the warm-workable high-strength steel sheet of the present disclosure may be manufactured by a method in which a hot-rolled or cold-rolled steel sheet obtained by hot rolling or further cold rolling a steel such as a slab having the aforementioned chemical composition, is subjected to an annealing holding step in which the steel sheet is heated to a temperature in the range of above 680° C. and not more than 720° C. and is held in the temperature range for 500 to 1000 s (s as the unit for time means seconds, the same applies hereinafter), and is then subjected to an annealing cooling step in which the steel sheet is cooled at a rate of cooling from Ms point to room temperature of not less than 10° C./s. During the annealing, carbides are dissolved to form austenite, and the annealing in the ferrite-austenite two-phase region is performed for a holding time optimized so as to control the distribution of elements. Further, the subsequent cooling is controlled so that the cooling from Ms point will take place at a rate of not less than 10° C./s, this control suppressing the diffusion of carbon from resultant martensite to adjacent retained austenite. Consequently, the steel sheet that is obtained attains a microstructure which includes retained austenite having the low C content specified in the present disclosure, and ferrite and martensite. The manufacturing method will be described in detail below.

First, the annealing step including the annealing holding step and the annealing cooling step will be described. A hot-rolled steel sheet or a cold-rolled steel sheet is subjected to the annealing step.

Average Rate of Heating to Annealing Temperature

The average rate of heating to the annealing temperature may be selected appropriately. An example preferred range is 1 to 100° C./s. Production efficiency is disadvantageously deteriorated if the rate is less than 1° C./s. Heating at a rate higher than 100° C./s disadvantageously makes it difficult to control the temperature on the planer surface of the steel sheet.

Annealing temperature: above 680° C. and not more than 720° C.

At annealing temperatures of 680° C. and below, austenite is not formed or, if any is formed, is excessively enriched with carbon and manganese to fail to provide the warm workability and the residual ductility according to the present disclosure. If, on the other hand, the annealing temperature is above 720° C., the amount of retained austenite is decreased and insufficient warm workability is encountered. Thus, the annealing temperature is limited to above 680° C. and not more than 720° C.

Annealing holding time: 500 to 1000 s

If the annealing time is less than 500 s, residual ductility is lowered. If, on the other hand, the annealing time exceeds 1000 s, the warm workability and the residual ductility according to the present disclosure cannot be obtained due to austenite being excessively enriched with carbon and manganese. Thus, the annealing holding time is limited to 500 to 1000 s.

In the present disclosure, steps between the annealing holding step and the annealing cooling step are not limited. For example, the steel sheet may be cooled to a cooling finish temperature that is slightly higher than the temperature of a zinc plating bath, then galvanized, and cooled to Ms point (° C.) in an appropriate manner. Alternatively, the steel sheet after the annealing holding step may be cooled to Ms point (° C.) in an appropriate manner without galvanization.

In the present disclosure, Ms point (° C.) is determined with formaster.

Galvanizing Treatment

As described above, the steel sheet may be galvanized after being held at the cooling finish temperature (for example, 350 to 600° C.). The chemical composition of the galvanizing bath is preferably composed of 0.10 to 0.25% Al and the balance being zinc and inevitable impurities. The galvanization may be followed by an alloying treatment. The alloying condition is preferably 460 to 600° C.

The galvanization, when performed, should take place before the steel sheet after the annealing holding step is cooled to Ms point. If the galvanization is performed after the steel sheet has been cooled to Ms point or below, the steel sheet cannot attain the microstructure of the present disclosure and fails to exhibit the warm workability according to the present disclosure.

Average rate of cooling from Ms point to room temperature: not less than 10° C./s After the treatments described above, the steel sheet is cooled to Ms point. Thereafter, the steel sheet is further cooled from Ms point to room temperature at an average cooling rate of not less than 10° C./s. If the average rate of cooling from Ms point to room temperature is less than 10° C./s, carbon is allowed to diffuse into retained austenite to raise the C content therein and consequently warm workability is deteriorated. Thus, the average rate of cooling from Ms point to room temperature is limited to not less than 10° C./s. The amount of carbon in retained austenite is increased by the diffusion of carbon also when the steel sheet is reheated during the process in which it is being cooled from Ms point, and therefore heating should not be performed during the cooling from Ms point to room temperature. The upper limit of the average cooling rate is not particularly limited, but is preferably 1000° C./s or below because cooling at more than 1000° C./s entails a large-scale cooling facility and leads to an increase in cost. The term room temperature means temperatures of 0 to 50° C.

The conditions in the manufacturing method before the annealing step are not particularly limited, but, for example, are preferably as described below.

A slab is preferably produced by a continuous casting process to prevent macro segregation, or may be made by an ingot making process or a thin slab casting process. The slab may be hot rolled in such a manner that the slab is once cooled to room temperature, then heated again, and hot rolled, or in such a manner that the slab is fed to a heating furnace without being cooled to room temperature and is hot rolled. Alternatively, an energy efficient process may be adopted in which the slab is retained for a short time and is immediately hot rolled. In the heating, the slab is preferably heated to 1100° C. or above in order to dissolve carbides and to avoid a high rolling load. To prevent an increase in scale loss, the slab heating temperature is preferably not more than 1300° C. The slab temperature refers to the temperature of the slab surface. In the hot rolling of the slab, a crude bar formed by rough rolling may be heated. A continuous rolling process may be adopted in which crude bars are joined to each other and finish rolling is performed continuously. Because finish rolling can increase anisotropy and cause a decrease in workability after cold rolling and annealing, it is preferable that the finish temperature be 800° C. or above. To reduce the rolling load and to ensure uniform shape and quality, it is preferable to perform lubricated rolling so that the frictional coefficient in all or some of the finish rolling passes will be 0.10 to 0.25.

After being coiled, the steel sheet is descaled by pickling or the like. In some cases, the steel sheet is further subjected to a heat treatment and cold rolling, and is thereafter further subjected to annealing and galvanization or the like.

The above cold rolling may be performed in a conventional manner. The rolling reduction in the cold rolling is not particularly limited but is preferably not less than 30% because the cold rolling with less than 30% rolling reduction can give rise to the occurrence of inhomogeneous structures such as coarse grains or non-recrystallized structures in the subsequent annealing. Further, the rolling reduction is preferably not more than 90% because the shape of the sheet may be deteriorated if the rolling reduction is above 90%. In the present disclosure, a heat treatment may be performed before the cold rolling. The maximum temperature that is reached in the heat treatment is preferably not more than 600° C. because changes such as the formation of austenite occur in the microstructure at above 600° C.

5) Warm Working Conditions

The warm-workable high-strength steel sheets of the present disclosure are suited for warm working at temperatures in the range of 50 to 200° C. If the warm working temperature is below 50° C. or above 200° C., the warm workability of the warm-workable high-strength steel sheets of the present disclosure may not be fully exhibited.

EXAMPLES

The exemplary embodiments of the present disclosure will be described in detail based on EXAMPLES herein below. The technical scope of the present disclosure is not limited to those EXAMPLES given below.

Steels having chemical compositions shown in Table 1 (the balance being Fe and inevitable impurities) were prepared by using a laboratory vacuum melting furnace and were rolled into steel slabs. The steel slabs were heated to 1200° C., then rough rolled, and finish rolled to give hot-rolled sheets (hot-rolled steel sheets) with a thickness of 3.0 mm. The hot rolling finish temperature was 900° C., and the coiling temperature was 500° C. After being coiled, the steel sheets were pickled. Next, some of the steel sheets were annealed (heat treated) at 600° C. for 1 hour for the purpose of softening, and were thereafter cold rolled into cold-rolled sheets (cold-rolled steel sheets (CR)) with a thickness of 1.4 mm. The hot-rolled sheets and the cold-rolled sheets were subjected to annealing.

The annealing was performed in a laboratory by heat treatment and plating apparatus under the conditions shown in Table 2. Consequently, warm-workable high-strength steel sheets which were the cold-rolled and annealed steel sheets, galvanized steel sheets (GI) and galvannealed steel sheets (GA) 1 to 22 were manufactured. Table 2 also shows the conditions for the cooling and plating between the annealing holding step and the annealing cooling step. The steel sheet No. 10 in Table 2 was once cooled to below Ms point during the cooling after the annealing, and thus the "average rate of cooling from Ms to room temperature" is left blank. The galvanized steel sheets were produced by dipping the steel sheets into a galvanizing bath at 460° C. to form a coating layer in a coating mass of 35 to 45 g/m$^2$ and the galvannealed steel sheets were manufactured by alloying, that is, holding the formed zinc layer at 550° C. for 1 to 60 S.

The warm-workable high-strength steel sheets which were the cold-rolled and annealed steel sheets, the galvanized steel sheets and the galvannealed steel sheets were temper rolled with 0.3% extension and were tested by the following test methods to evaluate tensile characteristics at room temperature, warm tensile characteristics and residual ductility. The results are shown in Table 3. Table 3 also shows data such as the area fractions of phases measured by the aforementioned method.

<Room Temperature Tensile Test>

The annealed sheet (or the base steel sheet in the case of the galvanized or galvannealed steel sheet, the same applying hereinafter) was cut along a direction parallel to the rolling direction to give a JIS No. 5 tensile test piece (JIS Z2201). The test piece was subjected to a tensile test at room temperature and 10$^3$/s strain rate in accordance with the conditions described in JIS Z2241. TS was thus measured. The sheets with 1180 MPa or higher TS were accepted.

<Warm Tensile Test>

The annealed sheet was cut along a direction parallel to the rolling direction to give a JIS No. 5 tensile test piece (JIS Z2201). The test piece was subjected to a tensile test at a test temperature of 80° C. or 150° C. and a strain rate of 10$^{-3}$/s. EL was thus measured. Warm workability was evaluated as good when EL measured by the warm tensile test was 27% or above.

<Residual Ductility>

The annealed sheet was strained to a uniform elongation of 27% under the same conditions as in the above warm tensile test at a test temperature of 150° C., and was thereafter cooled with a fan to room temperature at a rate of cooling to 100° C. or below of 10° C./s. A tensile test piece was sampled from a central region of the test piece, the tensile test piece being 30 mm in the length of parallel portions, 12.5 mm in the width of parallel portions, and 25 mm in the gauge length. A tensile test was performed at room temperature and 10$^{-3}$/s strain rate to determine EL. Residual ductility was evaluated as good when EL was 10% or above.

TABLE 1

| Steel | Chemical composition (mass %) | | | | | | | | Remarks |
| --- | --- | --- | --- | --- | --- | --- | --- | --- | --- |
| | C | Si | Mn | P | S | Al | N | Others | |
| A | 0.15 | 1.50 | 5.5 | 0.015 | 0.001 | 0.030 | 0.003 | — | Within inventive range |
| B | 0.15 | 1.50 | 5.5 | 0.015 | 0.001 | 0.030 | 0.003 | B: 0.0010 | Within inventive range |
| C | 0.15 | 1.50 | 5.5 | 0.015 | 0.001 | 0.030 | 0.003 | Cr: 0.10 | Within inventive range |
| D | 0.15 | 1.50 | 5.5 | 0.015 | 0.001 | 0.030 | 0.003 | Ni: 0.1 | Within inventive range |
| E | 0.15 | 0.50 | 7.0 | 0.015 | 0.001 | 1.000 | 0.003 | Cu: 0.1 | Within inventive range |
| F | 0.15 | 1.50 | 5.5 | 0.015 | 0.001 | 0.030 | 0.003 | Ca: 0.0010 | Within inventive range |
| G | 0.15 | 1.50 | 5.5 | 0.015 | 0.001 | 0.030 | 0.003 | REM: 0.0020 | Within inventive range |
| H | 0.01 | 1.50 | 5.5 | 0.015 | 0.001 | 0.030 | 0.003 | | Outside inventive range |
| I | 0.25 | 1.50 | 5.5 | 0.015 | 0.001 | 0.030 | 0.003 | — | Outside inventive range |
| J | 0.15 | 3.50 | 5.5 | 0.015 | 0.001 | 0.030 | 0.003 | | Outside inventive range |
| K | 0.15 | 1.50 | 9.0 | 0.015 | 0.001 | 0.030 | 0.003 | — | Outside inventive range |
| L | 0.15 | 1.50 | 2.5 | 0.015 | 0.001 | 0.030 | 0.003 | — | Outside inventive range |
| M | 0.15 | 1.50 | 4.0 | 0.015 | 0.001 | 0.030 | 0.003 | — | Within inventive range |
| N | 0.15 | 1.50 | 5.5 | 0.015 | 0.001 | 0.030 | 0.003 | Sb: 0.01 | Within inventive range |
| O | 0.15 | 1.50 | 5.5 | 0.015 | 0.001 | 0.030 | 0.003 | Sn: 0.05 | Within inventive range |
| P | 0.06 | 1.50 | 5.5 | 0.015 | 0.001 | 0.030 | 0.003 | — | Within inventive range |

TABLE 2

| Steel sheet No. | Steel | Cold rolling | Average heating rate (° C./s) | Annealing temperature (° C.) | Annealing holding time (s) | Average cooling rate (° C./s) | Cooling finish temperature (° C.) | Ms point (° C.) | Holding temperature after finish of cooling (° C.) |
|---|---|---|---|---|---|---|---|---|---|
| 1 | A | Yes | 5 | 700 | 1000 | 50 | 500 | 180 | 500 |
| 2 |   | Yes | 5 | <u>740</u> | 1000 | 50 | 500 | 260 | 500 |
| 3 | B | No | 5 | 700 | 1000 | 50 | 500 | 180 | 500 |
| 4 |   | No | 5 | <u>650</u> | 1000 | 50 | 500 | 120 | 500 |
| 5 | C | Yes | 5 | 700 | 1000 | 50 | 500 | 180 | 500 |
| 6 |   | Yes | 5 | 700 | <u>3600</u> | 50 | 500 | 150 | 500 |
| 7 | D | Yes | 5 | 690 | 1000 | 50 | 500 | 180 | 500 |
| 8 |   | Yes | 5 | 690 | 1000 | 50 | 500 | 180 | 500 |
| 9 | E | Yes | 5 | 710 | 1000 | 50 | 500 | 180 | 500 |
| 10 |   | Yes | 5 | 700 | 1000 | 50 | <u>150</u> | 180 | 500 |
| 11 | F | Yes | 5 | 700 | 1000 | 50 | 500 | 180 | 500 |
| 12 | G | Yes | 5 | 700 | 1000 | 50 | 500 | 180 | 500 |
| 13 | H | Yes | 5 | 690 | 1000 | 50 | 500 | 240 | 500 |
| 14 | I | Yes | 5 | 700 | 1000 | 50 | 500 | 40 | 500 |
| 15 | J | Yes | 5 | 700 | 1000 | 50 | 500 | 170 | 500 |
| 16 | K | Yes | 5 | 700 | 1000 | 50 | 500 | 80 | 500 |
| 17 | L | Yes | 5 | 700 | 1000 | 50 | 500 | 330 | 500 |
| 18 | M | Yes | 5 | 700 | 1000 | 50 | 500 | 180 | 500 |
| 19 | N | Yes | 5 | 700 | 1000 | 50 | 500 | 180 | 500 |
| 20 | O | Yes | 5 | 700 | 1000 | 50 | 500 | 180 | 500 |
| 21 | O | Yes | 5 | 700 | <u>180</u> | 50 | 500 | 180 | 500 |
| 22 | P | Yes | 5 | 700 | 1000 | 50 | 500 | 180 | 500 |

| Steel sheet No. | Holding time after finish of cooling (s) | Galvanizing bath temperature (° C.) | Alloying temperature (° C.) | Average rate of cooling from Ms to room temperature (° C./s) | *Steel sheet surface | Remarks |
|---|---|---|---|---|---|---|
| 1 | 100 | 460 | 550 | 15 | GA | INVENTIVE. EX. |
| 2 | 100 | 460 | 550 | 15 | GA | COMPARATIVE. EX |
| 3 | 100 | 460 | 550 | 15 | GA | INVENTIVE. EX. |
| 4 | 100 | 460 | 550 | 15 | GA | COMPARATIVE. EX |
| 5 | 100 | 460 | — | 15 | GI | INVENTIVE. EX. |
| 6 | 100 | 460 | — | 15 | GI | COMPARATIVE. EX |
| 7 | 100 | — | — | 15 | CR | INVENTIVE. EX. |
| 8 | 100 | — | — | <u>0.1</u> | CR | COMPARATIVE. EX |
| 9 | 100 | 460 | 550 | 15 | GA | INVENTIVE. EX. |
| 10 | 100 | 460 | 550 | — | GA | COMPARATIVE. EX |
| 11 | 100 | 460 | 550 | 15 | GA | INVENTIVE. EX. |
| 12 | 100 | 460 | 550 | 15 | GA | INVENTIVE. EX. |
| 13 | 100 | 460 | 550 | 15 | GA | COMPARATIVE. EX |
| 14 | 100 | 460 | 550 | 15 | GA | COMPARATIVE. EX |
| 15 | 100 | 460 | 550 | 15 | GA | COMPARATIVE. EX |
| 16 | 100 | 460 | 550 | 15 | GA | COMPARATIVE. EX |
| 17 | 100 | 460 | 550 | 15 | GA | COMPARATIVE. EX |
| 18 | 100 | 460 | 550 | 15 | GA | INVENTIVE. EX. |
| 19 | 100 | 460 | 550 | 15 | GA | INVENTIVE. EX. |
| 20 | 100 | 460 | 550 | 15 | GA | INVENTIVE. EX. |
| 21 | 100 | 460 | 550 | 15 | GA | COMPARATIVE. EX |
| 22 | 100 | 460 | 550 | 15 | GA | INVENTIVE. EX. |

*Steel sheet surface: CR: cold-rolled steel sheet, GI: galvanized steel sheet, GA: galvannealed steel sheet

TABLE 3

| Steel sheet No. | Steel sheet microstructure*[1] V (F) (%) | V (M) (%) | V (γ) (%) | V (B) (%) | Others (%) | C (γ) (%) | Md30 (° C.) | Warm tensile test temperature (° C.) | Room temperature TS (MPa) | Warm temperature EL (%) | Room temperature after warm working EL*[2] (%) | Remarks |
|---|---|---|---|---|---|---|---|---|---|---|---|---|
| 1 | 14 | 38 | 48 | 0 | 0 | 0.14 | 200 | 150 | 1510 | 44 | 12 | INVENTIVE. EX. |
| 2 | <u>2</u> | <u>88</u> | 10 | 0 | 0 | 0.01 | — | 150 | 1625 | <u>11</u> | — | COMPARATIVE. EX. |
| 3 | 15 | 41 | 44 | 0 | 0 | 0.17 | 210 | 150 | 1547 | 42 | 13 | INVENTIVE. EX. |
| 4 | 58 | 14 | 28 | 0 | 0 | <u>0.41</u> | 110 | 150 | <u>1056</u> | <u>24</u> | — | COMPARATIVE. EX. |

TABLE 3-continued

| | Steel sheet microstructure*[1] | | | | | | | Warm tensile test | Mechanical characteristics | | | |
|---|---|---|---|---|---|---|---|---|---|---|---|---|
| | | | | | | | | | Room temperature | Warm temperature | Room temperature after warm working | |
| Steel sheet No. | V (F) (%) | V (M) (%) | V (γ) (%) | V (B) (%) | Others (%) | C (γ) (%) | Md30 (° C.) | temperature (° C.) | TS (MPa) | EL (%) | EL*[2] (%) | Remarks |
| 5 | 13 | 39 | 48 | 0 | 0 | 0.14 | 200 | 150 | 1517 | 45 | 11 | INVENTIVE. EX. |
| 6 | 30 | 44 | 26 | 0 | 0 | <u>0.40</u> | 150 | 150 | 1360 | <u>26</u> | — | COMPARATIVE. EX. |
| 7 | 22 | 35 | 43 | 0 | 0 | 0.31 | 180 | 80 | 1382 | 38 | 14 | INVENTIVE. EX. |
| 8 | 25 | 34 | 41 | 0 | 0 | <u>0.42</u> | 130 | 150 | 1338 | <u>23</u> | — | COMPARATIVE. EX. |
| 9 | 15 | 36 | 49 | 0 | 0 | 0.15 | 190 | 150 | 1558 | 45 | 16 | INVENTIVE. EX. |
| 10 | 15 | <u>61</u> | 24 | 0 | 0 | <u>0.44</u> | 80 | 150 | 1298 | <u>19</u> | — | COMPARATIVE. EX. |
| 11 | 16 | 38 | 46 | 0 | 0 | 0.15 | 200 | 150 | 1509 | 44 | 13 | INVENTIVE. EX. |
| 12 | 15 | 40 | 45 | 0 | 0 | 0.14 | 200 | 150 | 1496 | 43 | 12 | INVENTIVE. EX. |
| 13 | 38 | 34 | 28 | 0 | 0 | 0.01 | — | 150 | <u>1021</u> | <u>23</u> | — | COMPARATIVE. EX. |
| 14 | 11 | 30 | 59 | 0 | 0 | <u>0.53</u> | 60 | 150 | 1769 | <u>26</u> | — | COMPARATIVE. EX. |
| 15 | 15 | 39 | 46 | 0 | 0 | 0.14 | 190 | 150 | 1563 | 46 | <u>7</u> | COMPARATIVE. EX. |
| 16 | 10 | 30 | 60 | 0 | 0 | 0.11 | 170 | 150 | 1720 | 55 | <u>8</u> | COMPARATIVE. EX. |
| 17 | 63 | 10 | 13 | 13 | 1 | <u>0.51</u> | 50 | 150 | <u>756</u> | 33 | 21 | COMPARATIVE. EX. |
| 18 | 42 | 27 | 31 | 0 | 0 | 0.35 | 200 | 150 | 1224 | 36 | 11 | INVENTIVE. EX. |
| 19 | 14 | 37 | 49 | 0 | 0 | 0.14 | 200 | 150 | 1517 | 43 | 13 | INVENTIVE. EX. |
| 20 | 15 | 36 | 49 | 0 | 0 | 0.14 | 200 | 150 | 1522 | 44 | 13 | INVENTIVE. EX. |
| 21 | 31 | 41 | 28 | 0 | 0 | <u>0.40</u> | 200 | 150 | 1276 | <u>26</u> | — | COMPARATIVE. EX. |
| 22 | 47 | 37 | 16 | 0 | 0 | 0.03 | 290 | 150 | 1218 | 32 | 10 | INVENTIVE. EX. |

*[1] V (F): ferrite area fraction, V (M): martensite area fraction, V (γ): retained austenite area fraction, V (B): bainite area fraction, C (γ): amount (mass %) of carbon in retained austenite
*[2] Elongation at room temperature after strained with 27% EL at warm temperature All the warm-workable high-strength steel sheets of INVENTIVE EXAMPLES exhibited room temperature TS of not less than 1180 MPa, warm EL of not less than 27%, and superior residual ductility after warm working. The steel sheet No. 7 exhibited excellent performance in the warm tensile test at a test temperature of 150° C., with warm EL being 33%. In contrast, COMPARATIVE EXAMPLES which were outside the ranges of the present disclosure failed to attain the desired results in terms of one or more of TS, warm workability and residual ductility.

INDUSTRIAL APPLICABILITY

According to the present disclosure, warm-workable high-strength steel sheets having excellent warm workability and superior residual ductility after warm working can be obtained.

The invention claimed is:

1. A warm-workable high-strength steel sheet having a chemical composition comprising:
   C: 0.05 to 0.20%, by mass %;
   Si: not more than 3.0%, by mass %;
   Mn: 3.5 to 8.0%, by mass %;
   P: not more than 0.100%, by mass %;
   S: not more than 0.02%, by mass %;
   Al: 0.01 to 3.0%, by mass %;
   N: not more than 0.010%, by mass %; and
   Fe and inevitable impurities,
   wherein the steel sheet has a microstructure that comprises, in area fractions, 10 to 60% retained austenite, 10 to 80% ferrite, 5 to 50% martensite and 0 to 5% bainite, the C content in the retained austenite being less than 0.40 mass %.

2. The warm-workable high-strength steel sheet according to claim 1, wherein Md30 is 80 to 280° C.

3. The warm-workable high-strength steel sheet according to claim 1, wherein the chemical composition further comprises one or more selected from:
   Cr: 0.005 to 2.0%, by mass %;
   Ni: 0.005 to 2.0%, by mass %;
   Cu: 0.005 to 2.0%, by mass %;
   B: 0.0001 to 0.0050%, by mass %;
   Ca: 0.0001 to 0.0050%, by mass %;
   REM: 0.0001 to 0.0050%, by mass %;
   Sn: 0.01 to 0.50%, by mass %; and
   Sb: 0.0010 to 0.10%, by mass %.

4. The warm-workable high-strength steel sheet according to claim 2, wherein the chemical composition further comprises one or more selected from:
   Cr: 0.005 to 2.0%, by mass %;
   Ni: 0.005 to 2.0%, by mass %;
   Cu: 0.005 to 2.0%, by mass %;
   B: 0.0001 to 0.0050%, by mass %;
   Ca: 0.0001 to 0.0050%, by mass %;
   REM: 0.0001 to 0.0050%, by mass %;
   Sn: 0.01 to 0.50%, by mass %; and
   Sb: 0.0010 to 0.10%, by mass %.

5. The warm-workable high-strength steel sheet according to claim 1, which has a galvanized coating or a galvannealed coating on a surface thereof.

6. The warm-workable high-strength steel sheet according to claim 2, which has a galvanized coating or a galvannealed coating on a surface thereof.

7. The warm-workable high-strength steel sheet according to claim 3, which has a galvanized coating or a galvannealed coating on a surface thereof.

8. The warm-workable high-strength steel sheet according to claim 4, which has a galvanized coating or a galvannealed coating on a surface thereof.

9. The warm-workable high-strength steel sheet according to claim 1, which has a tensile strength of not less than 1180 MPa and an elongation at 150° C. of not less than 27%.

10. The warm-workable high-strength steel sheet according to claim 2, which has a tensile strength of not less than 1180 MPa and an elongation at 150° C. of not less than 27%.

11. The warm-workable high-strength steel sheet according to claim 3, which has a tensile strength of not less than 1180 MPa and an elongation at 150° C. of not less than 27%.

12. The warm-workable high-strength steel sheet according to claim 4, which has a tensile strength of not less than 1180 MPa and an elongation at 150° C. of not less than 27%.

13. The warm-workable high-strength steel sheet according to claim 5, which has a tensile strength of not less than 1180 MPa and an elongation at 150° C. of not less than 27%.

14. The warm-workable high-strength steel sheet according to claim 6, which has a tensile strength of not less than 1180 MPa and an elongation at 150° C. of not less than 27%.

15. The warm-workable high-strength steel sheet according to claim 7, which has a tensile strength of not less than 1180 MPa and an elongation at 150° C. of not less than 27%.

16. The warm-workable high-strength steel sheet according to claim 8, which has a tensile strength of not less than 1180 MPa and an elongation at 150° C. of not less than 27%.

17. A method for manufacturing a warm-workable high-strength steel sheet as claimed in claim 1, the method comprising:
   a hot rolling step of hot rolling a steel into a hot-rolled steel sheet, the steel having a chemical composition comprising:
   C: 0.05 to 0.20%, by mass %,
   Si: not more than 3.0%, by mass %,
   Mn: 3.5 to 8.0%, by mass %,
   P: not more than 0.100%, by mass %,
   S: not more than 0.02%, by mass %,
   Al: 0.01 to 3.0%, by mass %,
   N: not more than 0.010%, by mass %, and
   Fe and inevitable impurities,
   a pickling step of pickling the hot-rolled steel sheet,
   an annealing holding step of heating the pickled steel sheet to a temperature in a range of above 680° C. and not more than 720° C. and holding the steel sheet in the temperature range for 500 to 1000 s, and
   an annealing cooling step of cooling the steel sheet at an average rate of cooling from Ms point to room temperature of not less than 10° C./s.

18. The method for manufacturing a warm-workable high-strength steel sheet according to claim 17, wherein the method further comprises a cold rolling step of cold rolling the steel sheet after the pickling step to form a cold-rolled steel sheet, and
   the cold-rolled steel sheet is subjected to the annealing holding step.

19. The method for manufacturing a warm-workable high-strength steel sheet according to claim 17, wherein the method comprises galvanizing the steel sheet between the annealing holding step and the annealing cooling step.

20. The method for manufacturing a warm-workable high-strength steel sheet according to claim 19, wherein the method further comprises alloying the steel sheet between the galvanizing and the annealing cooling step.

21. A method for manufacturing a warm-workable high-strength steel sheet as claimed in claim 1, the method comprising:
   an annealing holding step of heating a hot-rolled or cold-rolled steel sheet to a temperature in a range of above 680° C. and not more than 720° C. and holding the steel sheet in the temperature range for 500 to 1000 s, and
   an annealing cooling step of cooling the steel sheet at an average rate of cooling from Ms point to room temperature of not less than 10° C./s,
   wherein the hot-rolled or cold-rolled steel sheet has a chemical composition including:
   C: 0.05 to 0.20%, by mass %,
   Si: not more than 3.0%, by mass %,
   Mn: 3.5 to 8.0%, by mass %,
   P: not more than 0.100%, by mass %,
   S: not more than 0.02%, by mass %,
   Al: 0.01 to 3.0%, by mass %,
   N: not more than 0.010%, by mass %, and
   Fe and inevitable impurities.

* * * * *